(12) United States Patent
Wood et al.

(10) Patent No.: US 6,296,435 B1
(45) Date of Patent: Oct. 2, 2001

(54) GRAIN WAGON HAVING AN UNLOADING CONVEYOR WITH A MOVEABLE DISCHARGE SPOUT CONTROLLED FROM A TOW VEHICLE

(75) Inventors: James E. Wood; Scott M. Grieshop, both of Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 0 days.

(21) Appl. No.: 09/500,563

(22) Filed: Feb. 9, 2000

(51) Int. Cl.[7] ........................................................ B60P 1/40
(52) U.S. Cl. ............................ 414/523; 414/335; 198/536
(58) Field of Search .................................... 198/536, 641; 414/523, 335; 56/219, 16, 6

(56) References Cited

U.S. PATENT DOCUMENTS

| | | |
|---|---|---|
| 1,798,231 | 3/1931 | Thiemann . |
| 1,847,433 | 3/1932 | Krause . |
| 2,563,432 | 8/1951 | Sterler . |
| 2,724,516 * | 11/1955 | Weishaar ........................ 198/536 X |
| 2,748,958 * | 6/1956 | Moser ................................. 414/335 |
| 3,144,928 | 8/1964 | Roloson . |
| 4,415,303 * | 11/1983 | Westendorf et al. ............ 414/523 X |
| 5,167,581 | 12/1992 | Haag . |
| 5,340,265 | 8/1994 | Grieshop . |
| 5,343,995 | 9/1994 | Scarrow . |
| 5,575,316 * | 11/1996 | Pollklas ............................ 141/198 |
| 5,979,151 * | 11/1999 | Sanders et al. ................ 56/16.6 X |

* cited by examiner

Primary Examiner—Steven A. Bratlie
(74) Attorney, Agent, or Firm—Jacox, Meckstroth & Jenkins

(57) ABSTRACT

A grain wagon includes a wheel supported frame on which is mounted a hopper or container for receiving grain, and the wagon is pulled by a tow vehicle or tractor. An inclined discharge conveyor or auger has a folding outer section which projects upwardly and forwardly and laterally outwardly from the container. The auger has a pivotal discharge spout and a pivotal internal baffle, and the spout is actuated by a double acting hydraulic cylinder controllable through hydraulic lines from the cab of the tractor so that the tractor operator may fully load and "top off" the grain within an adjacent semi-trailer as the tractor operator pulls the wagon along the length of the semi-trailer.

3 Claims, 2 Drawing Sheets

GRAIN WAGON HAVING AN UNLOADING CONVEYOR WITH A MOVEABLE DISCHARGE SPOUT CONTROLLED FROM A TOW VEHICLE

BACKGROUND OF THE INVENTION

The present invention is directed to an improved grain wagon of the general type disclosed in U.S. Pat. No. 5,340,265 which issued to the Assignee of the present invention and the disclosure of which is incorporated by reference. As generally disclosed in this patent, a grain receiving hopper or container is mounted on a wheel supported frame having a hitch connected to a tow vehicle or tractor. The grain wagon includes an inclined grain discharge auger having an outer section pivotally connected to a lower section and moved by a hydraulic cylinder between a stored position adjacent the front wall of the container and a forwardly and laterally outwardly projecting position for unloading grain from the container. The outer section of the inclined auger has a downwardly projecting discharge spout through which the grain is discharged from the auger into a semi-trailer located adjacent the grain wagon.

It has been known to connect a flexible discharge tube to an auger discharge spout so that the tube depends from the spout. As grain is unloaded from the grain wagon into an adjacent open top semi-trailer, a person standing on the trailer or on the grain within the trailer can move the flexible tube so that the semitrailer may be fully loaded and "topped-off" by rounding the grain at the top of the semitrailer. However, the maneuvering of the flexible tube requires an additional person on or within the semi-trailer or the operator of the tractor must step down and climb up on the semi-trailer. Such additional person or operator time adds to the cost of transferring the grain from the wagon to the trailer.

It has been found desirable to provide a grain wagon with a foldable unloading auger such as disclosed in above-mentioned Pat. No. 5,340,265 and wherein the auger has a moveable and power operated discharge spout on its outer or upper end portion. It is also desirable for the spout to have sufficient movement in order to discharge the grain from the auger back and forth across the entire width of the semi-trailer in order for the trailer to be fully loaded with grain and for the grain to be rounded at the top of the semi-trailer. It has further been found desirable for the power operated moveable or pivotal discharge spout to be controllable by the towing tractor operator so that as the operator moves the tractor and grain wagon along the length of the semi-trailer in incremental steps, the operator may also conveniently and precisely direct the grain back and forth across the width of the semi-trailer.

Such a structure enables the unloading auger to be efficiently operated at maximum speed in order to minimize the time required to transfer the grain from the grain wagon to the semi-trailer and to load the semi-trailer uniformly along its length. While it is known to have pivotable or adjustable discharge spouts or deflectors on grain conveyors, for example, as disclosed in U.S. Pat. Nos. 1,798,231, U.S. Pat. No. 1,847,433 and No. 5,343,995, no one has previously recognized the significant advantages of having a grain wagon discharge auger with a power operated moveable discharge spout which is remotely controllable by the operator of the towing tractor.

SUMMARY OF THE INVENTION

The present invention is directed to an improved wheel supported grain wagon with an inclined unloading auger having a moveable or pivotal discharge spout which is remotely moveable back and forth by the operator of the towing vehicle or tractor. Thus the present invention enables the operator of the tractor to direct the grain precisely while unloading the grain from the grain wagon into an adjacent semi-trailer as the wagon is pulled along the length of the trailer. As a result, a grain wagon constructed in accordance with the present invention provides for efficiently and quickly unloading the grain wagon into a semi-trailer in a manner that assures that the semi-trailer is fully filled with the grain and the grain is uniformly rounded along the top of the semi-trailer.

In accordance with a preferred embodiment of the invention, a wheel supported grain wagon is connected to a towing vehicle or tractor and includes a hopper or container with an inclined discharge auger having an outer section projecting upwardly and laterally outwardly from the container. The outer end portion of the auger is provided with a fixed discharge spout section which supports a pivotal discharge spout section and a pivotal baffle member within the pivotal spout section. The pivotal spout section has a tapered lower end portion, and a double acting fluid cylinder extends between the fixed spout section and the pivotal spout section. Hydraulic lines extend from the cylinder down the auger and forwardly to the standard hydraulic coupler fittings at the rear of the tractor which tows the grain wagon. Thus the operator of the tractor may positively move the pivotal discharge spout section back and forth as the operator pulls the grain wagon slowly or in incremental steps along the length of the open top semi-trailer which receives the grain from the auger. As a result, the operator of the towing tractor may direct the grain from the auger into the semi-trailer and back and forth across the width of the trailer to assure optimum loading of grain within the trailer.

Other features and advantages of the invention will be apparent from the following description, the accompanying drawings and the appended claims.

DETAILED DESCRIPTION OF THE PREFERRED EMBODIMENT

Figure 1:
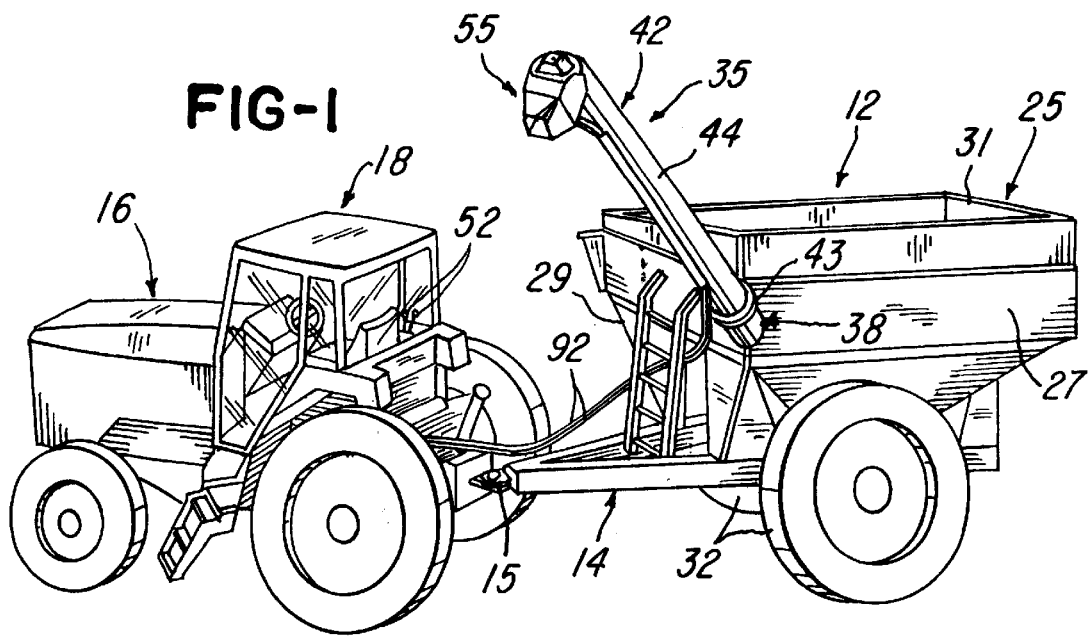
FIG. 1 is a perspective view of a grain wagon connected to a tow tractor and incorporating a grain unloading auger with a moveable discharge spout assembly controlled by the tractor operator in accordance with the invention.

FIG. 1 shows a grain wagon 12 incorporating the improvement of the invention and having a support frame 14 with a hitch 15 for pivotally connecting the frame to a tow vehicle or tractor 16 having a cab 18 for enclosing a tractor operator. The frame 14 supports a hopper or container 25 which has opposite side walls 27, a front wall 29 and a back wall 31. All of the walls have lower portions which slope downwardly and inwardly and form a tapering lower portion. of the container 25. The frame 14 and container 25 are supported by a pair of wheels 32 and, in general, the grain wagon 12 is constructed similar to the grain wagon disclosed in above mentioned U.S .Pat. No. 5,340,265, the disclosure of which is herein incorporated by reference.

The grain wagon 12 also includes an inclined grain unloading conveyor or auger assembly 35 which includes an inner portion or section 38 and an outer portion or section 42 pivotally connected at 43 for folding movement of the outer section 42 between a generally horizontal retracted position adjacent the front wall 29 of the container 25 and a forwardly and upwardly and laterally outwardly projecting operating position (FIG. 1) when it is desired to unload grain from the container 25.

Each of the auger sections 38 and 42 includes a grain confining tubular conduit 44 which encloses a grain moving member or rotary helical screw or flight 46 (FIG. 4) mounted on a center shaft 48. The upper end portion of the shaft 48 is supported by a bearing 51 enclosed within a housing mounted on the upper end of the conduit 44, and an inner or lower end portion of the shaft 48 is connected to a power operated drive such as a hydraulic motor or a shaft connected to the power takeoff of the tow tractor 16, as shown in the above '265 patent. As also disclosed in the '265 patent, the folding of the outer auger section 42 between its stored position and its operating position is produced by a double acting hydraulic cylinder which is connected by hydraulic lines to quick connect hydraulic coupler fittings on the rear of the tow tractor 16 so that the folding movement of the auger section 42 may be controlled by the tractor operator within the cab 18 by moving one of the hydraulic valve control levers 52.

In accordance with the present invention, the upper end portion of the outer auger section 42 is provided with a discharge spout assembly 55 through which grain is discharged from the auger unit or assembly 35 when it is desired to transfer grain from the grain wagon container 25 to an open top semi-trailer (not shown) extending adjacent the tow vehicle or tractor 16 and the grain wagon 12. The spout assembly 55 includes box-like fixed spout section 58 (FIG. 3) which is secured or welded to the auger housing or conduit 44 and pivotally supports a moveable spout section 60 by a pair of pivot bolts or pins (not shown) extending through holes 62 within opposite side walls 64 of the moveable spout section 60 and opposite side walls 66 of the spout section 58. The moveable or pivotal spout section 60 also includes a top wall 68 and a bottom wall 69 (FIGS. 4 and 5) which are integrally connected by the side walls 64. A tapered or truncated funnel portion projects from the walls 64, 68 and 69 and defines a grain discharge opening 73.

Figure 4:
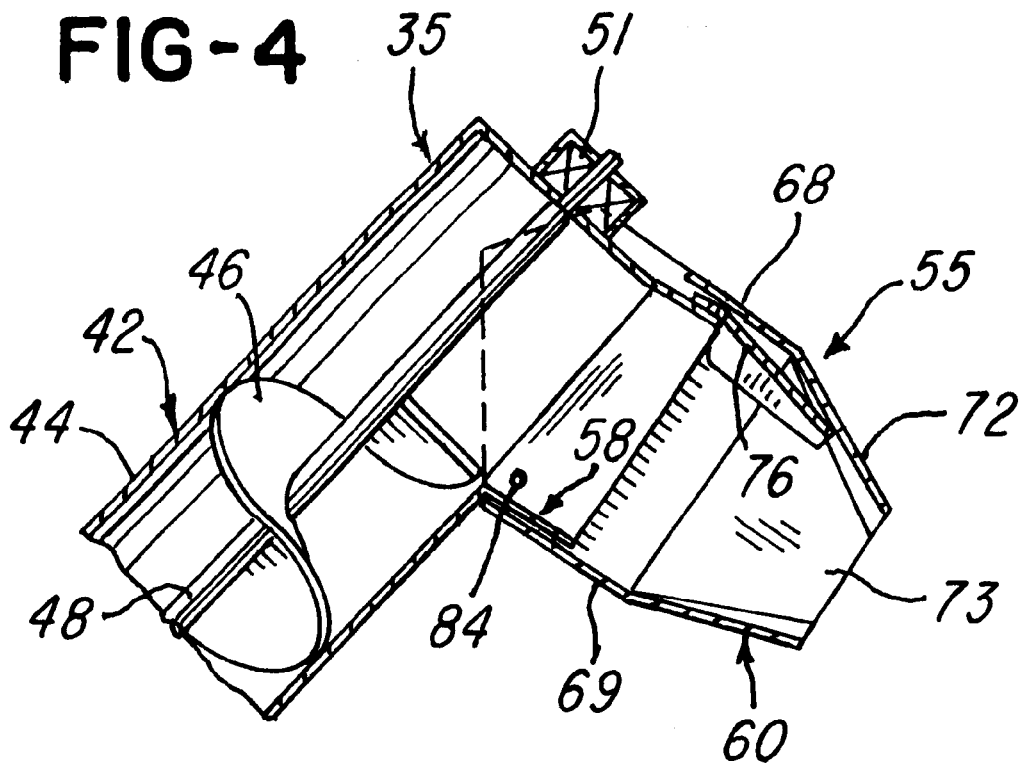
FIG. 4 is a fragmentary vertical section of the auger and discharge spout assembly shown in FIG. 2 and with the spout assembly in its upper position for discharging grain laterally and downwardly.
Figure 5:
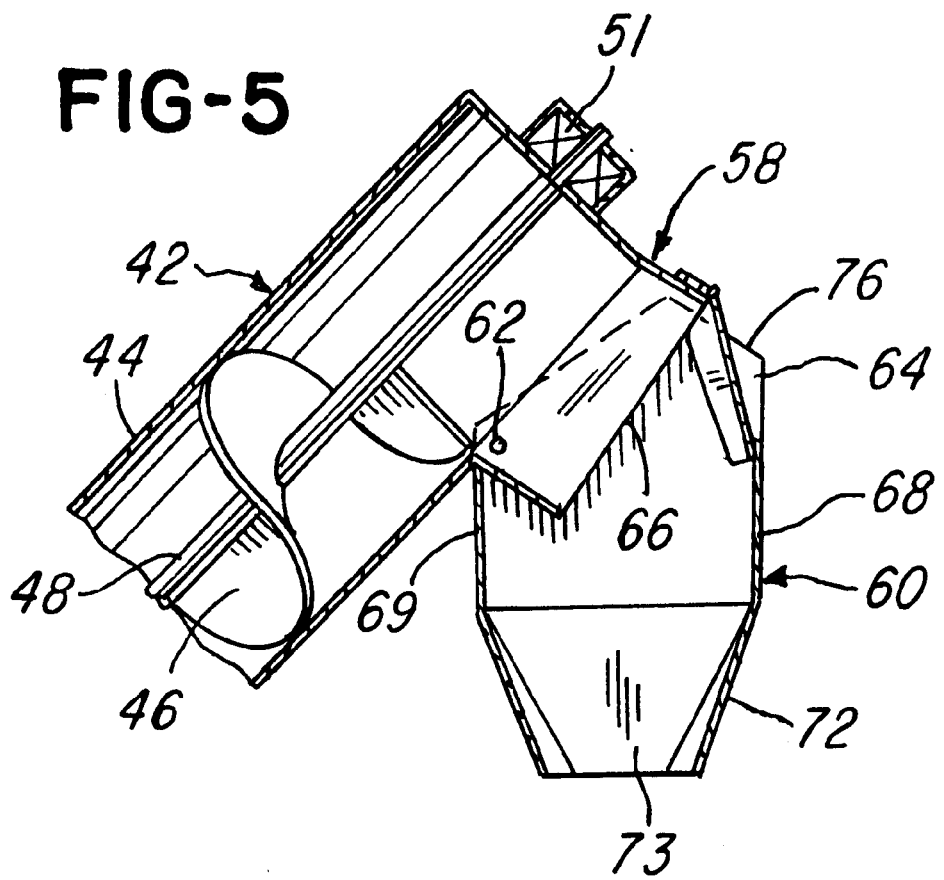
FIG. 5 is a fragmentary section similar to FIG. 4 and showing the spout assembly in its lower position for discharging grain downwardly.

The fixed spout section 58, which is welded to the auger housing 44, also supports a pivotal baffle member 76 (FIG. 3) which is pivotally connected to the top wall of the spout section 58 by a hinge 78. As shown in FIGS. 4 and 5, the outer spout section 60 is moveable or pivotable between an upper position (FIG. 4) for discharging grain laterally outwardly and downwardly and a lower position (FIG. 5) for directing grain straight downwardly from the upper end portion of the auger section 42. As also shown in FIGS. 4 and 5, when the spout section 60 moves or pivots relative to the spout section 58, the baffle member 76 also pivots. The force of the grain against the baffle member 76 urges the baffle member against the top wall 68 of the spout section 60. The baffle member 76 is also tapered so that it may project into the tapered end portion 72 of the spout section 60 when the spout section 60 is moved to its upper position as shown in FIG. 4.

Figure 2:
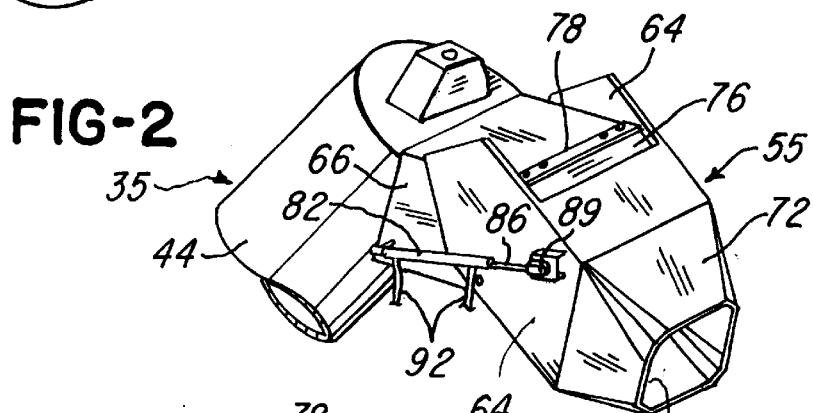
FIG. 2 is a perspective view of the auger discharge spout assembly shown in FIG. 1 and constructed in accordance with the invention.
Figure 3:
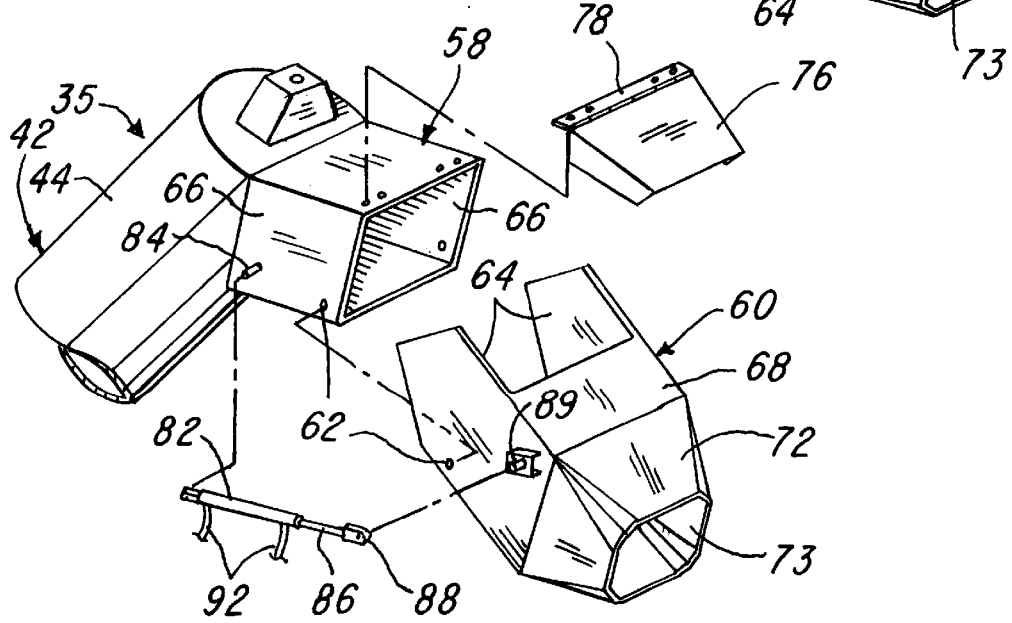
FIG. 3 is an exploded view of the auger discharge spout assembly shown in FIG. 2.

The pivotal movement of the spout section 60 is controlled by an actuator in the form of a double acting hydraulic cylinder (FIG. 2) which is pivotally connected to the spout section 58 by a pivot bolt or pin 84 (FIG. 3). The cylinder 82 has a piston rod 86 which is pivotally connected to the spout section 60 by a fitting 88 and a pivot bolt or pin 89 projecting from a bracket welded to the adjacent side wall 64 of the spout section 60. A pair of power supply or flexible hydraulic conduits or lines 92 extend from the hydraulic cylinder 82 downwardly along the auger section 42 and then forwardly past the hitch 15 to the hydraulic control quick connect coupler fittings on the back of the tractor 16. Thus when one of the hydraulic valve control levers 52 is actuated by the operator of the tractor 16, the discharge spout 60 positively moves at a controlled rate or speed between its upper and lower positions (FIGS. 4 and 5) when the auger assembly 35 is unloading grain from the container 25 of the grain cart 12.

From the drawings and the above description, it is apparent that a grain wagon having an unloading conveyor or auger with a discharge spout assembly constructed and operated in accordance with the present invention, provides desirable features and advantages. As a primary feature and as mentioned above, as the operator of the tow tractor 16 commences to pull the grain wagon 12 along the side of an open top elongated semi-trailer, the operator moves the conduit section 42 from its stored position to its extended position. The operator then moves the wagon either slowly or in incremental steps along the length of the semi-trailer while grain is being unloaded by operation of the auger assembly 35. While unloading grain, the tractor operator also moves a control lever 52 to pivot the spout section 60 up and down so that the grain is directed back and forth across the width of the semi-trailer. As a result, the auger assembly 35 may be operated at its optimum speed in order to minimize the time required from transferring the grain from the wagon container 25 into the adjacent semi-trailer. The positive and remote control over the pivoting of the spout section 60 also enables the operator of the tractor to round off or top off the grain uniformly along the length of the semi-trailer and thereby fully load the trailer without requiring another person or that the operator dismount from the tractor 16.

While the form of grain wagon and its method of use herein described constitute a preferred embodiment of the invention, it is to be understood that the invention is not limited to the precise grain wagon and method described, and that changes may be made therein without departing from the scope and spirit of the invention as defined in the appended claims.

What is claimed is:

1. In a grain wagon pivotally connected to a tow tractor for transferring grain from a field to an open-top semi-trailer, said wagon including a wheel supported frame having a hitch pivotally connecting said frame to said tractor, a container supported by said frame for receiving a volume of grain, an elongated auger conveyor including a motor driven auger with a helical flight within a tubular auger housing and having a lower portion and an upper portion, said lower portion of said auger conveyor mounted on said wagon and positioned to receive grain from said container, said upper portion of said auger conveyor supported for folding movement between a retracted stored position adjacent said container and an operating position projecting upwardly and laterally outwardly from said container, and said tubular housing for said upper portion of said auger conveyor having a discharge spout defining a discharge outlet, the improvement comprising a spout assembly including a tubular flow control spout supported by said discharge spout for tilting movement on a generally horizontal axis between an upper position and a lower position relative to said upper portion of said auger conveyor, a hydraulic actuator connected to tilt said flow control spout between said upper and lower positions, a hydraulic fluid supply line extending from said actuator along said auger conveyor and said frame and forwardly across said hitch to said tractor, said hydraulic fluid supply line being flexible to provide for pivoting said upper portion of said auger conveyor between said stored and operating positions and for pivoting said grain wagon relative to said tractor, and a hydraulic control valve on said tractor to enable the driver to control the tilting of said flow control spout while pulling said grain wagon along one side of the semi-trailer with said tractor for efficiently and uniformly filling and topping off the semi-trailer with grain.

2. A grain wagon and tow vehicle as defined in claim 1 wherein said tubular flow control spout includes inwardly converging walls forming a funnel portion having a discharge opening smaller than said discharge outlet for directing a controlled stream of grain into the semi-trailer.

3. A grain wagon and tow vehicle as defined in claim 1 wherein said spout assembly includes a pivotally supported baffle member extending between said discharge spout and said tubular flow control spout to provide for a smooth flow of grain through said spout assembly while said flow control spout is tilted by said actuator between said upper and lower positions.

\* \* \* \* \*